J. R. PERRY.

Reed Organ-Reeds.

No. 135,581.   Patented Feb. 4, 1873.

Witnesses.   Inventor.

Seth Tuck   Joseph R. Perry.

Jos. A. Mears.

UNITED STATES PATENT OFFICE.

JOSEPH R. PERRY, OF WILKESBARRE, PENNSYLVANIA.

IMPROVEMENT IN REED-ORGAN REEDS.

Specification forming part of Letters Patent No. 135,581, dated February 4, 1873.

*To all whom it may concern:*

Be it known that I, JOSEPH R. PERRY, of Wilkesbarre, in the county of Luzerne and State of Pennsylvania, have invented certain Improvements in Reeds for Organs, of which the following is a description:

My invention relates mainly to the construction of the reed-block, so that it shall prevent the hissing noise occasioned by the impeded air at the fastened end. This object I accomplish by cutting the block through about half-way from the end, while the reed is left the usual length required for a given tone. It relates also to combining the reed with this form of block by any way which will produce a permanent fastening. It has for its object, also, the modification of the tone according to the length of said openings through the blocks, and the saving of wind in blowing them.

Figure 1:
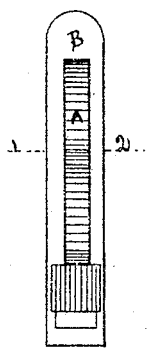
Figure 2:
Figure 3:
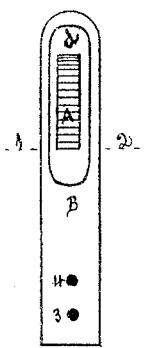

In the accompanying drawing, Figure 1 is a top view of an organ reed and block, showing the tongue A secured to the block B. The dotted line at 1 2 show the length of opening through the block, which opening I usually make about one-half the length of the reeds; but this may be varied to suit any desired tone. Fig. 2 is a reed and block turned on its edge, showing the cutting through at the dotted line 1 2, and the milling out of the block under the reed at $c$ on the top of the block, and the milling out at $d$ on the bottom side. Fig. 3 shows a reed-block turned bottom side up, exposing that portion of the reed seen through the opening; also, the milling away of the block around it, $d$, to allow for a free escape of air. 3 4 are the rivets, when the tongue is fastened in that way.

Figure 4:
Figure 5:
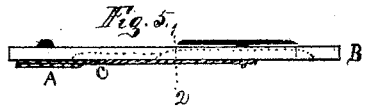

It can make no material difference whether the reed is fastened on the bottom or top side of the block, as shown in Fig. 4, in which the dotted line 1 2 indicates the opening, and the milling away of a portion of the block on the under side $x$ $x$; nor does it matter whether the reed has an additional strip fastened to the end to run parallel with the face of the block, as shown by Fig. 5, which is a side view of the same, or not.

The letters and figures refer to similar parts in each figure.

Having thus described my invention, what I claim is—

The block B formed with a partial opening less in length than the vibrating portion of the reed-tongue, substantially as described and shown, and combined with the tongue A, as and for the purpose specified.

J. R. PERRY.

Witnesses:
   JOS. A. MEARS,
   SETH TUCK.